G. L. SCHOFIELD.
AUTOTRACTOR.
APPLICATION FILED JUNE 11, 1917.
1,356,474.
Patented Oct. 19, 1920.
6 SHEETS—SHEET 1.
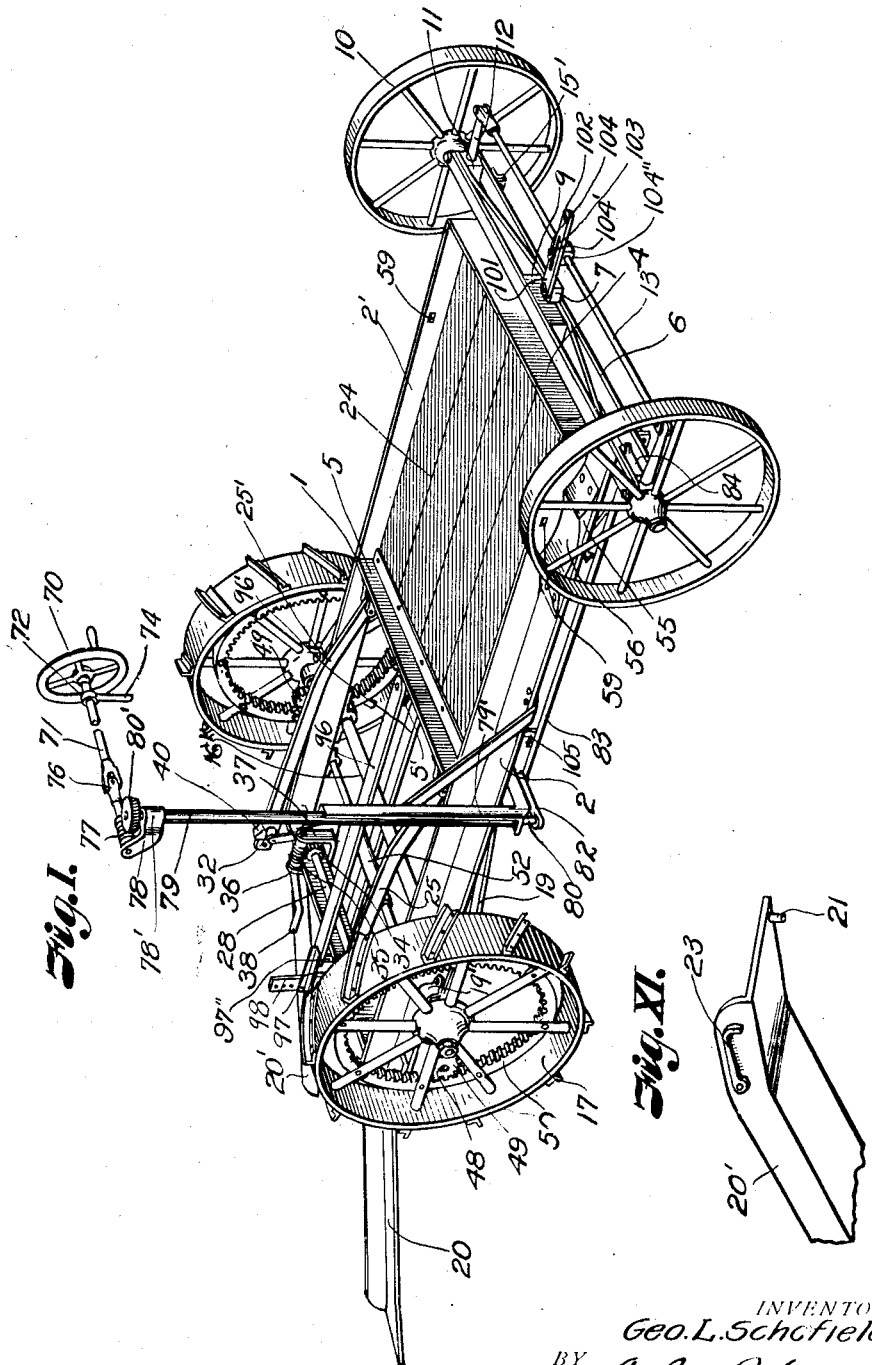
INVENTOR.
Geo. L. Schofield.
BY
Arthur C. Brown,
ATTORNEY

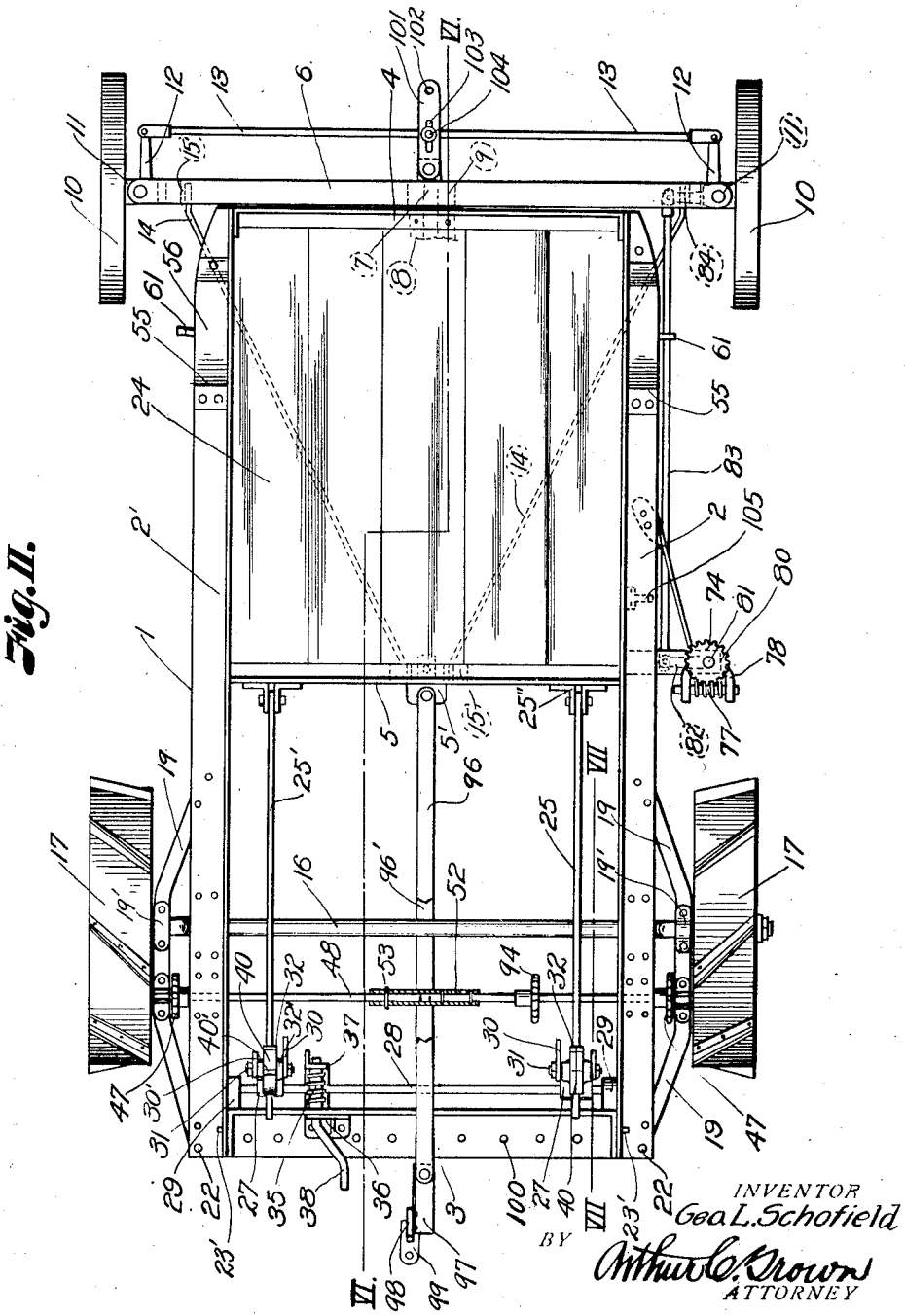

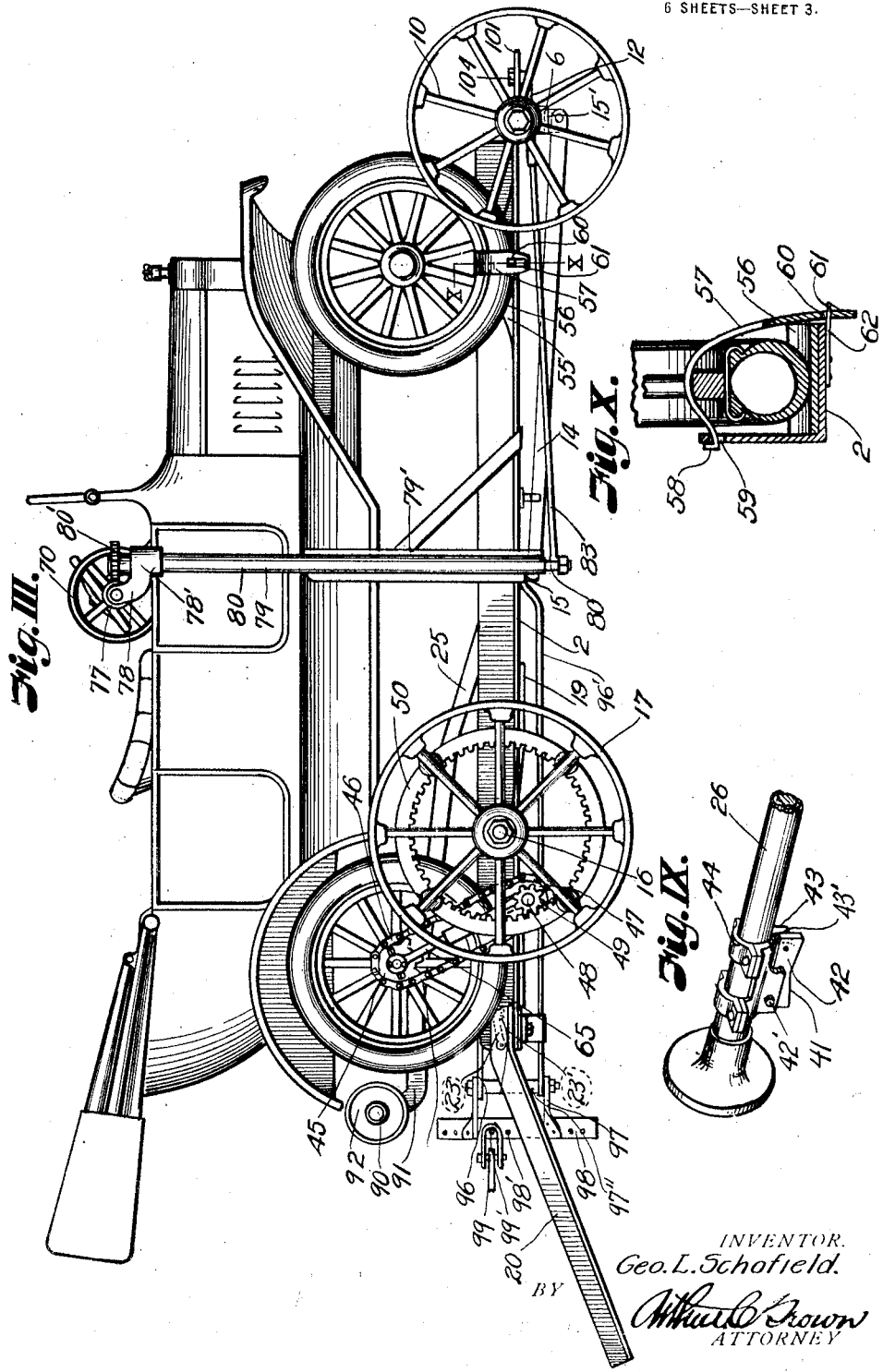

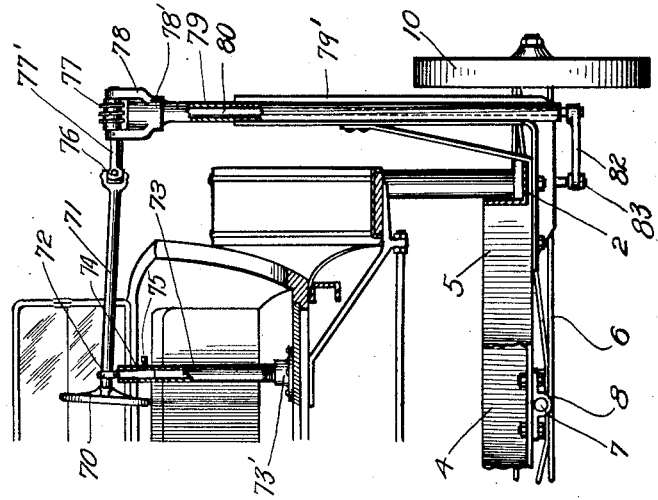
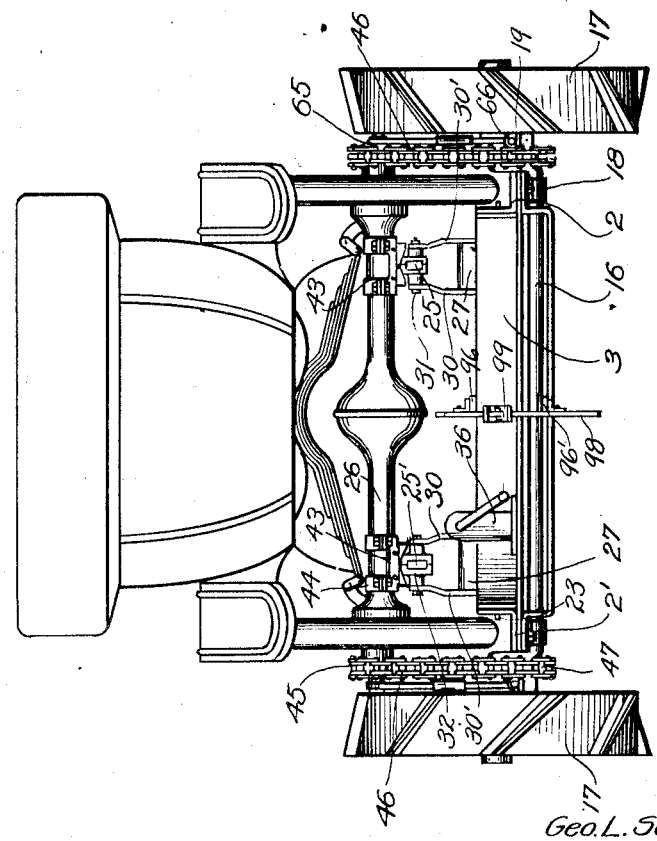

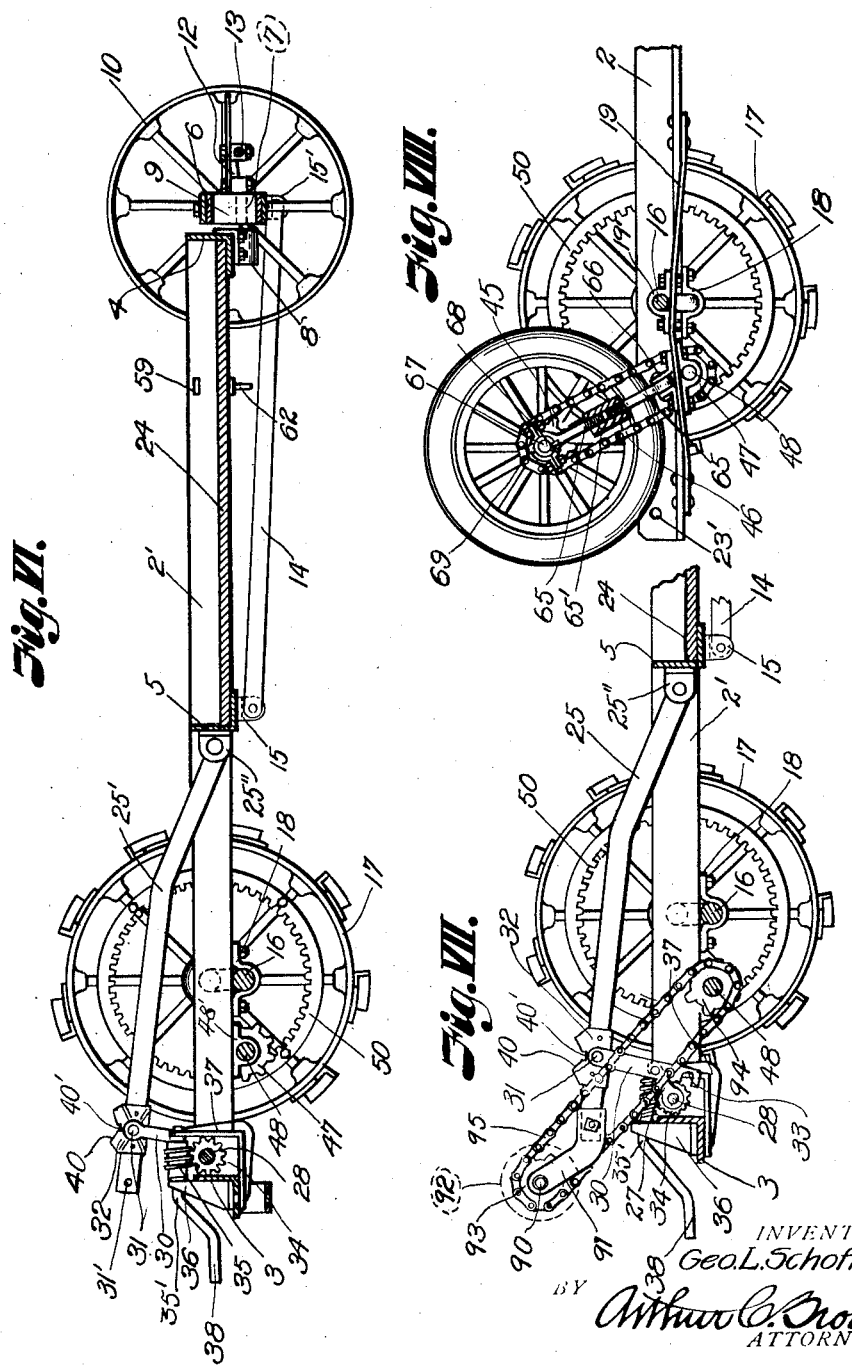

G. L. SCHOFIELD.
AUTOTRACTOR.
APPLICATION FILED JUNE 11, 1917.
1,356,474.
Patented Oct. 19, 1920.
6 SHEETS—SHEET 6.
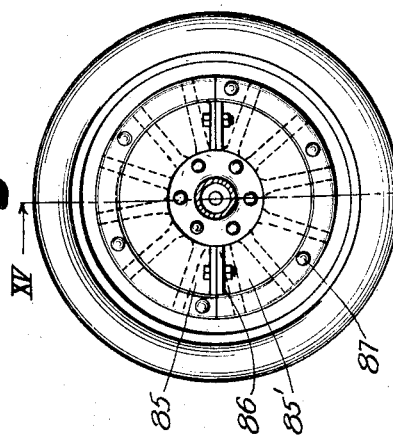
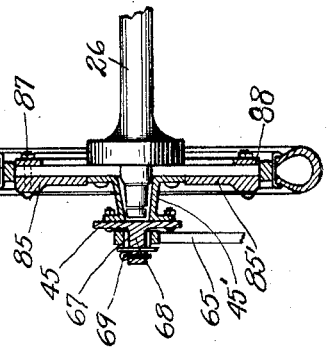
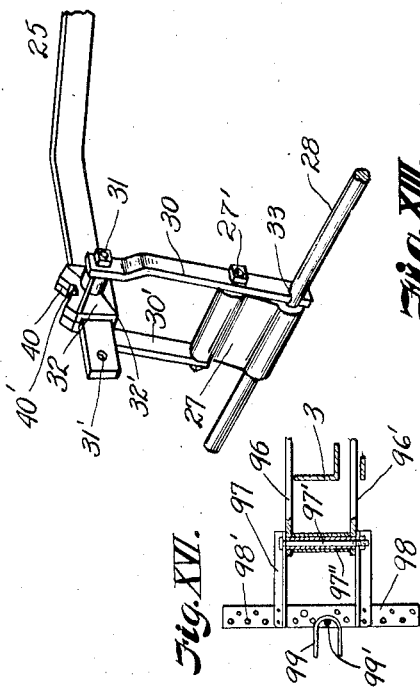
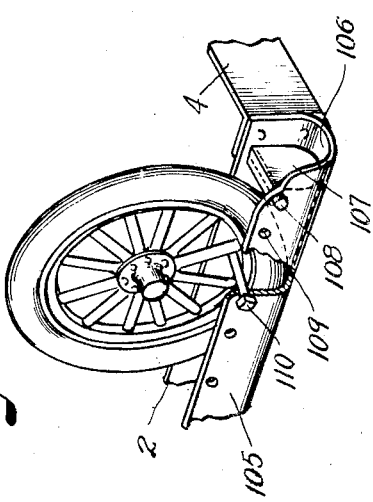
INVENTOR.
George L. Schofield.
BY
Arthur C. Brown
ATTORNEY

UNITED STATES PATENT OFFICE.

GEORGE L. SCHOFIELD, OF KANSAS CITY, MISSOURI, ASSIGNOR, BY MESNE ASSIGNMENTS, TO AUTOMOTIVE TRACTOR CORPORATION OF AMERICA, OF KANSAS CITY, MISSOURI, A CORPORATION OF MISSOURI.

AUTOTRACTOR.

1,356,474.      Specification of Letters Patent.      Patented Oct. 19, 1920.

Application filed June 11, 1917. Serial No. 174,004.

*To all whom it may concern:*

Be it known that I, GEORGE L. SCHOFIELD, a citizen of the United States, residing at Kansas City, in the county of Jackson and State of Missouri, have invented certain new and useful Improvements in Autotractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to auto tractors, and more particularly to a tractor of that class wherein an ordinary self-propelled pleasure vehicle is temporarily mounted on a carrier frame and geared down to propel the combined structure at a low speed and high power for agricultural or road-hauling purposes.

It is the principal object of the invention to provide a structure whereby the pleasure vehicle may carry the user to and from the point of tractor use upon its own tires and springs and under the ordinary conditions of automobile use, and there run onto and connected with the carrier frame to effect the tractor combination and to provide a structure wherein the vehicle and carrier parts may be rigidly and effectively connected in a manner that will permit the pleasure vehicle to ride on its springs on the carrier frame and thereby obviate damage from shock and strain from the frame.

Other objects of the invention are to provide effective driving connection between the frame drive wheels and the power plant of the superimposed vehicle, convenient and effective draft connection from the frame to a follower, such as a plow or trailer truck, convenient and effective steering mechanism, etc., as presently more specifically set forth in the following description, in which reference is made to the accompanying drawings showing the preferred form of structure, and wherein:—

Figure I is a perspective view of a tractor frame or carrier constructed according to the present invention.

Fig. II is plan view of the same.

Fig. III is a side view of the carrier with an automobile in functional position thereon.

Fig. IV is a rear end view of the same.

Fig. V is a detail, sectional view of part of the tractor showing a preferred arrangement of the tractor steering mechanism relative to the automobile.

Fig. VI is a longitudinal section of the carrier on the line VI—VI, Fig. II.

Fig. VII is a similar view on the line VII—VII, Fig. II.

Fig. VIII is a side view of a portion of the carrier and one of the drive wheels of an automobile and carrier driving parts.

Fig. IX is a perspective view of part of one of the vehicle axles, particularly illustrating one of the seats for centering the vehicle axle on the tractor.

Fig. X is a sectional view on the line X—X, Fig. III, showing means for clamping the front vehicle wheels to the carrier frame.

Fig. XI is a detail perspective view of the mounting end of one of the approach runways.

Fig. XII is a detail perspective view of a set of hoisting parts, showing particularly the locking toggle link connection.

Fig. XIII is a modified form of frame runways and wedge blocks for locking the vehicle wheels therein.

Fig. XIV is a side elevation of a motor vehicle drive wheel equipped with counter-weights for stabilizing driving movement of the vehicles.

Fig. XV is a sectional view of the stabilizing or fly wheel, on the line XV—XV, Fig. XIV.

Fig. XVI is a side view of a preferred form of clevis for connecting the tractor draw bars with a following implement or vehicle.

Referring more in detail to the drawings: 1 designates the tractor frame or carrier comprising paired, parallel runways 2—2' connected by the front and rear cross-beams 3—4 and an intermediate cross-beam 5, all of which preferably comprise angle irons with the cross-beams securely riveted to the longitudinal runways and the latter spaced to accommodate an automobile of standard road gage.

In order to provide the flexibility necessary to permit the frame to automatically adjust itself to unevenness of field or road surface, I pivot the front end of the frame from the forward axle 6 by a pivot pin 7 (Fig. VI) arranged longitudinally in bearing 8—9 suspended from the front cross-beam 4 of the frame and from the axle 6 respectively, thereby affording pivotal movement of the frame on a longitudinal axis and obviating damage to the frame or tractor bars by twisting due to unevenness of surface over which the tractor moves.

The forward running gear comprises, in addition to the axle 6, the guide wheels 10 which are mounted on ordinary steering knuckles 11 having forwardly extending arms 12 connected transversely across the frame by a steering mechanism hereinafter described.

The axle 6 is braced from its ends and retained positively in transverse alinement with the frame by radius rods 14 which are pivotally connected at their forward ends with ears 15' that depend from the ends of the axle and are pivotally attached at their inner ends to ears 15 depending from the intermediate cross-beam 5 of the main frame; the pivotal mounting of the tension rods serving to substantially brace the axle without interfering with its free pivotal movement on the pin 7.

The frame 1 is supported at its rear end on a transverse drop axle 16 upon which the traction wheels 17 are revolubly mounted; the axle being secured by bearings 18 and braced from the frame by bars 19 (Figs. II and VIII) which are attached to the axle by collars 19' and riveted or otherwise permanently secured to the side frame members at points both forwardly and in rear of the axle.

The forward and intermediate cross-beams 4—5 are preferably arranged with the horizontal angle members facing to provide supports for a flooring 24 that coöperates with the side and cross-beams to form the tool box in which tools, or parts needed for the operation or connection of the tractor, may be carried.

The tractor frame may be hung as low as practicable and still leave sufficient under-clearance in order that the self-propelled vehicle may be run easily onto and from the frame; the movement of the vehicle to and from position on the frame being effected by approach runways 20—20', preferably comprising angle irons, each of which has a width substantially equal to the base of the frame runways and adapted for overlying the rear ends of the same; each of said approach runways having a pin 21 (Fig. XI) on its under side adapted for seating in an aperture 22 (Fig. II) in the runway 2 or 2' and provided with a hook 23 that is pivotally attached to the side flange and adapted for taking over a pin 23' on the side flange of the frame runway to retain the approach in assembled relation to the frame while the vehicle is moved thereonto or therefrom.

As the power for driving the tractor is derived from the motor of the superimposed vehicle it is necessary to raise the drive wheels of the vehicle out of contact with the frame runways and, as a simple means for accomplishing this elevation, I provide a hoist comprising spaced hoist arms 25—25'; the forward ends of which are pivotally mounted between the bracket ears 25'' on the rear face of the intermediate frame beam 5; the levers being slightly bowed to extend over the rear axle 16. The hoist arms 25—25' are operated synchronously from rocker arms 27 (Fig. XII) that are rigidly fixed on a rocker shaft 28 that is revolubly mounted at its ends in bearings 29 fixed to the main frame 1.

Pivotally mounted on each of the rocker arms 27 by means of a bolt 27' (see Fig. XII) is a pair of toggle links 30—30'; the outer ends of which extend on opposite sides of their hoist arms 25—25' and are pivotally connected with a bolt 31 that extends through one of several apertures 31' in the arm; the several apertures being provided to effect a desired lifting adjustment of the arm. The bolt 31 also extends through bearings 32' on a seat block 32 that is thereby attached to the lever and comprises a downset seat having covering sides 40 and a base socket 40' adapted for coöperation with relative parts on a seat block on the vehicle axle, as will presently be more fully described, in order that when the hoist arms are raised the seat blocks may fit into and automatically center the seat block on the vehicle.

In order to lock the hoist arms in their elevated position and coöperative relation with the vehicle axle, I extend the toggle link 30 of each of the elevator pairs beyond the bolt 27 and provide it with a rearwardly opening socket 33 adapted for receiving the rocker shaft 28 when the toggle is straightened, so that the link not only forms a supplemental support for the hoist arms but also provides a lock that will prevent vertical movement of the levers after they have been located in set position; it being apparent that the links 30 automatically position themselves over the shaft upon the elevation of the rocker arms by rotation of the shaft. The shaft 28 is rotated to effect the rocking movement of the arms 27 and thereby the raising or lowering of the rear end of the motor vehicle, preferably through a gear wheel 34 (Fig. VI) which is fixed on the rocker shaft and meshes with a worm 35 fixed on a short shaft 35' that is rotatably mounted in bracket arms 36—37 on the rear cross-beam 3; the rear end of the worm shaft 35 extending beyond the frame and comprising a crank 38 whereby the worm may be operated for the purposes set forth.

Fixed to the rear axle of the motor vehicle (Fig. IX), by collars 44 are bearing blocks 43 which extend longitudinally beneath the axle and comprise longitudinal, downwardly opening slots 43′ in which are fixed the seat plates 42, having upset triangular seats 41 adapted for coöperation with the seat blocks 32 on the rocker toggles to center and anchor the motor vehicle in its elevated position; it being apparent that as the toggle blocks open transversely and the vehicle axle blocks longitudinally relative to the vehicle, both a longitudinal and transverse centering effect is produced that will compensate for any slight inaccuracy of positioning of the vehicle on the frame and is usually sufficient to effect the centering and elevating functions without readjustment of the vehicle after it has been driven onto the frame under its own power.

The seat plate 42 on the vehicle axle is preferably composed of steel or hardened, tough material that will resist the centering wear and may be replaced if necessary upon removal of the bolts 42′, whereby the plate is attached to its bracket.

To adapt the vehicle for its driving relation to the tractor frame or carrier I preferably attach connecting devices to the hubs of the driving wheels of the vehicle; such connecting devices in one form consisting of caps 45′ that are attached to the wheel in any suitable manner and extend beyond the ends of the hubs.

Fixed to the caps 45′ are sprocket wheels 45, and run over said sprocket wheels and over mating sprocket wheels 47 on a jack shaft 48 that is journaled in bearings 48′ on the tractor frame, are chain belts 46, whereby the jack shaft is rotated upon operation of the vehicle motor; the belts being applied to the mating sprocket wheels before the vehicle has been raised to its complete elevation by the worm gear in order that the chains may be easily applied and tightened to functional position upon the ultimate positioning of the vehicle.

The jack shaft 48 extends transversely beyond the sides of the frame and into internal gear rings 50 that are permanently fixed to the traction wheels of the carrier; the ends of the shafts having spur-wheels 49 fixed thereon and meshing with the teeth of the internal gear rings to revolve the rings upon operation of the shaft; a considerable reduction in speed from the vehicle driving mechanism to the traction wheels of the carrier being effected in the sprocket connection and also in the spur-wheel and ring connection, so that the tractor may be driven at a slow speed while the motor in the vehicle is working at a high speed, thereby effecting the powerful drive for the tractor. A differential effect in the rear axle of the tractor is provided by dividing the shaft 48 into two sections, the abutting ends of which are preferably inclosed in a tubular sleeve 52 which may be permanently fixed to one of the sections but is of sufficient internal diameter to permit free movement of the end of the other section therein so that the rigidity of the shaft is maintained while providing the required differential.

When so desired the shaft sections may be rigidly connected by inserting a pin 53 (Fig. II) through the sleeve and loose shaft section, so that the drive wheels may operate as a unit.

Some additional stability of the vehicle on the frame may be afforded by seating the forward wheels of the vehicle in blocks 55 on the runways 2—2′; the blocks having concaved, backwardly facing seats 56 for receiving the wheels of the vehicle and the said wheels being preferably clamped to the blocks and to the runway by strips 57 (Figs. III and X) each of which comprises a hook 58 at one end adapted for projection through an aperture 59 in the vertical runway flange and for bearing against the inner face of the flange when in locking position, and at the opposite end with a slot 60 for receiving the head 61 of a hook 62 that is fixed to and projects laterally beyond the bottom of the runway.

It is apparent that the clamps may be easily and quickly operated to release the wheels by lifting the hook heads 61 to unseat the same from the clamp slots and then turning the clamps on their pivotal mounting in the runway apertures 59.

As a means for affording additional rigidity and stability to the driving parts, I provide adjustable brace rods 65 at each side of the vehicle, the lower ends of which are pivotally mounted in bearings 66 on the brace bars 19, and the upper ends provided with bearing sleeves 67 (Fig. XV) which take over extension 68 on the ends of the sprocket wheels 45; the sleeves 67 being preferably held in place by cotter pins 69 on the ends of the extension 68. These brace rods are preferably sectional with the sections connected by turn buckles 65′ (Fig. VIII) to effect any necessary adjustment, but which maintain rigidity in the rods that brace the vehicle axle against the force applied thereon by the drive belts 46.

The steering of the tractor is preferably effected entirely independently of the steering mechanism of the self-propelled vehicle although the tractor steering mechanism is adapted for ready access from the seat of the vehicle when the latter is in place; the tractor steering mechanism comprising a hand wheel 70 on one end of a rod 71 which connects with the steering mechanism of the tractor through a universal joint 76 as presently more fully described, and carrying adjacent the wheel an anchor spindle 74 that is connected with the shaft by a collar 72 and adapted for projection into the open top of a tubular standard 73 that is removably mounted on the floor of the motor vehicle.

The standard may comprise a length of pipe threaded at its lower end for application to a base plate 73' which may be removably attached to the floor of the vehicle so that the pipe may be removed if desired.

With this arrangement the spindle may be lowered into the pipe until the handle is at the desired elevation and then fixed in position by a set screw 75 that extends through the side of the pipe to contact with the spindle.

The outer end of the rod 71 connects through the universal coupling 76 with the shaft extension 77' of a worm 77 which latter is revolubly mounted between the arms 78 of a bracket 78' which is mounted on the upper end of a tubular standard 79 that is rigidly fixed in an angle brace 79' carried by the main frame 1.

Revolubly mounted in the tubular standard 79 is a shaft 80, the upper end of which is located above the bracket 78' and has rigidly fixed thereto a gear wheel 80' that meshes with the worm 77 so that when the steering wheel 70 is revolved the shaft 80 is revolved therewith. The lower end of the shaft 80 extends below the main frame and carries a laterally extended arm 82 which is connected through a rod 83 with an arm 84 on one of the steering knuckles 11 and thereby extending the steering mechanism of the hand wheel to the knuckle mechanism to guide the tractor; the steering force being conducted from the connected wheel to the wheel at the opposite side of the frame through an ordinary connecting rod 13.

The driving force of the motor may be stabilized by converting the drive wheels of the vehicle into fly wheels by applying weights thereto, one form of such weights comprising semi-circular sections 85—85' that fit into the wheel rims and have flanges 86 along their adjacent edges whereby they may be bolted together and held on the wheels by bolts 87 that extend through the weight sections and are anchored in the ring 88 (see Fig. XV) located against the opposite face of the wheel.

It is apparent that such construction would operate as the ordinary fly wheel to oppose any sudden acceleration or diminution of speed.

The tractor may also be adapted for driving independent mechanisms, such as grinding mills, saws, etc., the preferred embodiment of an attachment for this purpose comprising a transverse shaft 90 (Fig. VII) revolubly mounted in brackets 91 that may be removably attached to the ends of the levers 25—25' so that the attachment may be applied to or removed from the tractor frame at will.

Fixed on the shaft 90 is a belt wheel 92 and a sprocket wheel 93; the latter being located in alinement with a sprocket wheel 94 on the jack shaft 48 to carry a chain belt 95 whereby the shaft 90 is operated from the jack shaft.

When the auxiliary power device is to be used, the spur-wheels 49 that ordinarily mesh with the tractor wheel gear rings are removed from the ends of the shaft 48 and the vehicle motor operated in the usual manner to drive the auxiliary power device through a belt not shown, that may run over the belt wheel 92.

In order to apply the draft to the frame in the most effective way, so that a follower, such as an implement or road vehicle may be drawn from the tractor frame with a minimum strain on the frame and to the most effective point of the follower, I provide a draw bar comprising the separate members 96—96' which overlie the rear cross beam 3 and the forward ends of which lie on opposite sides of ears 5' which project rearwardly from the intermediate crossbeam 5. The rear ends of the bars are connected with clevis links 97, preferably by a bolt 97' which extends through the bars and through a double sleeve 97''; the inner part of the sleeve extending into apertures of the bars and bearing against the inner face of the clevis links 97 and the outer member of the sleeve bearing against the inner faces of the bars 96—96', thereby spacing the bars and providing for free rotatable movement of the clevis. The links 97 are rigidly attached to a vertical connecting bar 98 having a plurality of apertures 98' therein for receiving a pin 99' whereby a clevis yoke 99 may be adjustably connected with the clevis bar.

The rear cross-beam 3 of the carrier or tractor frame may also be provided with apertures 100 for receiving coupling pins, whereby a follower may be connected with the frame, thereby affording additional means for draft.

As a means for connection of the carrier or tractor frame with a towing vehicle, I preferably provide a towing link 101 which is pivotally connected with the forward head of the pivot pin 7 and provided at its forward end with an aperture 102 into which the hook of a towing hook may be projected. The hook 101 has a longitudinal, vertical slot 103 in which a pin 104 is slidably mounted; the upper end of the pin having a head 104' whereby it is held to the link and at its lower end carries a block 104'' that is attached to the connecting rod 13 of the knuckle steering mechanism.

It is apparent that with this connection, when the carrier is being towed, movement of the link to either side of the center will shift the connecting rod in that direction and thereby effect a steering effect on the front wheels that will insure the tractor frame following the towing vehicle.

When the carrier is to be towed as described, the steering rod 83 is first disconnected from the arm 82 of the steering shaft 81 and supported from the frame, preferably on a hook 105 on the side beam 2.

In Fig. XIII I have shown a slightly modified form of runway adapted for centering the vehicle wheels as they move onto the carrier, and comprising a channeled or trough-like elongated seat 105 having a curved base 106 for receiving the tires of the vehicle. With this construction I provide wedge blocks 107 which fit both the runway channel and the wheel of the tire and which may be held in functional position within the channels by pins 108 that are adapted for projection through registering apertures 109 in the walls of the channel and through corresponding apertures in the block. A pin 110 may also be extended between the walls of the runway to overlie the wheel rim and thereby prevent the wheel from jumping from the seat.

Assuming the carrier or tractor frame to be constructed as described and the motor vehicle equipped with the attachments for effecting coöperation thereof with the frame, and further assuming that it is desired to use the tractor in a field at some distance from its place of storage, the user runs the pleasure vehicle up the approach runways 20 onto the frame, so that the front wheels of the vehicle seat in the blocks 55 and the rear wheels are in position back of the traction wheels of the carrier. The chain belts 46 are then placed over the sprocket wheels of the jack shaft and on the vehicle axle and the lifting worm operated to raise the levers 25—25' and thereby raise the rear wheels of the vehicle from contact with the tractor frame and to an elevation at which the drive chains will be held taut.

The toggle mechanism, as above described, not only serves to raise the levers but the lock links of the mechanism serve to lock the levers in elevated position by automatically assuming their locking relation with the rocker shaft.

Should the vehicle be slightly off center, either longitudinally or transversely relative to the rocker shaft, the centering blocks of the levers and vehicle axle respectively, upon engagement, automatically shift the position of the vehicle as it is raised to effect the seating of the seat block on the axle bearing in the seat sockets in the lever members, so that the vehicle is moved into proper alinement, and strain on the parts, particularly the driving belts, is obviated.

The front wheels of the vehicle may then be strapped down to the frame to complete the attachment of the motor vehicle to the carrier. The operator then returns to his seat in the pleasure vehicle and swinging the steering rod 71 over into the vehicle positions the spindle 74 in the supporting standard 73 and locks the spindle in place, so that the tractor may be steered from the seat of the pleasure vehicle as easily and accurately as the steering of the vehicle itself would be effected. The runways 20 are then removed and the tractor moved into position relative to the follower with which it is to be connected, and when the follower has been hooked on may move forwardly through the field or over the road under power of the motor vehicle, geared down to tractor speed through the chain and spur connections.

If working in a field, at the end of the day, the driver may disconnect the tractor from the follower, disconnect the pleasure vehicle from the carrier, run the vehicle off of the frame and return home in the vehicle, the attachment of the vehicle and its disconnection thereof from the carrier being effected in a very few minutes and without great labor. In fact, the entire connection may be made by a single person so that the tractor is in fact a "one-man machine."

While I have described the tractor as adapted for field use, it is apparent that it is as well adapted for road use, as trailers may be attached to the rear of the carrier and conducted over ordinary roads. The same tractor that is used in the field may also be used for road use and, if desired, the user may not only conduct a load but may also take a number of persons into town, and may there remove the vehicle from the carrier, so that the vehicle may be used for a pleasure vehicle while the trailers are being unloaded. When ready to return, the user may run the vehicle back onto the carrier and conduct the same with the empty trailers back home.

While I have further referred to certain details of construction, it is apparent that such reference was not made for the purpose of limitation but merely as illustration, and that it is not my intention to limit the scope of the invention to such specified details.

Having thus described my invention, what I claim as new therein, and desire to secure by Letters-Patent, is:—

1. An auto tractor comprising a carrier for a motor vehicle, hoist mechanism on the carrier engageable with the vehicle and having movement to lift the vehicle above the carrier and means for locking the hoist mechanism, movable to locking position synchronously with lifting movement of said mechanism.

2. An auto tractor comprising a carrier for a motor vehicle, hoist mechanism on the carrier engageable with the vehicle and having movement to lift the vehicle above the carrier, means for locking the hoist mechanism, movable to locking position synchronously with lifting movement of said mechanism, and driving connection for the vehicle and carrier movable to functional position by elevation of the vehicle.

3. An auto tractor comprising a carrier for a motor vehicle, a motor vehicle comprising an axle, having centering seats, hoist mechanism on the carrier comprising centering seats for coöperating with like seats on the vehicle axle and engageable therewith upon elevation of the vehicle from the carrier, and means for operating said hoist mechanism to elevate the vehicle.

4. An auto tractor comprising a carrier for a motor vehicle, lever mechanism on the carrier comprising centering seats for coöperating with like seats on the vehicle axle and engageable therewith upon elevation of the vehicle from the carrier and means for raising said lever mechanism to elevate the vehicle.

5. In an auto tractor, a wheel supported carrier for a motor vehicle, levers, each having one end pivoted to the carrier, the other end of each lever being adapted to be raised and lowered and engageable with the vehicle to move the latter to functional position, a rocker mechanism supported on the carrier and connected to the respective levers near their free ends, and driving means between the motor vehicle and the wheels of the carrier mounted for driving the wheels of the carrier when the motor vehicle is raised.

6. In an auto tractor, a carrier frame, hoist mechanism comprising spaced arms pivotally connected with the frame and having free ends engageable with the vehicle to move the same to functional position, a rocker shaft mounted on the frame, rocker arms fixed on said shaft and operatively connected with said spaced arms, and means for operating the rocker shaft to move said spaced arms to and from engagement with the vehicle.

7. In an auto tractor, a carrier frame comprising parallel runways for mounting a motor vehicle thereon, transverse beams connecting said runways, a hoist mechanism comprising spaced arms pivotally connected with one of said cross beams and having free ends engageable with the vehicle to move the latter to functional position, a rocker shaft mounted on the frame, rocker arms fixed on said shaft and operatively connected with the said spaced arms, and means for operating the rocker shaft to operate said spaced arms to and from engagement with the vehicle for the purpose set forth.

8. In an auto tractor, a carrier frame, a hoist mechanism comprising spaced arms pivotally mounted on the frame and having free ends engageable with the vehicle, centering seats on the free ends of said arms adapted to coöperate with similar seats on the vehicle, a rocker shaft mounted on the frame, rocker arms fixed on said shaft, toggle link mechanism connecting said rocker arms with said hoist arms, a gear wheel fixed on the rocker shaft, a crank actuating worm shaft mounted on the frame in mesh with the said rocker shaft gear whereby said rocker shaft may be rocked to actuate said hoist arms into engagement with the vehicle to raise and center the latter in functional position on the frame.

9. In an auto tractor, a carrier frame comprising traction wheels, gears on said wheels, a sectional jack shaft rotatably mounted on the frame and having spur wheels meshed with said gears, means for maintaining alinement of said shaft sections, and means for connecting the separate shaft sections with the driving wheels of a superimposed motor vehicle.

10. In an auto tractor, a carrier frame comprising traction wheels, gear rings on said wheels, a section jack shaft rotatably mounted on the frame and having spur wheels meshing with the gear rings, means for maintaining alinement of the shaft section, and means for connecting the separate shaft sections with the drive wheels of a superimposed motor vehicle.

11. In an auto tractor, a carrier frame comprising traction wheels, gears on said wheels, a sectional jack shaft rotatably mounted on the frame and having spur wheels meshing with said gears, means for maintaining alinement of the shaft section, means for connecting the separate shaft sections with the drive wheels of a superimposed motor vehicle, and means for connecting the shaft sections to effect united action thereof.

12. In an auto tractor, a carrier frame comprising tractor wheels, gears on said wheels, a jack shaft, removable spur wheels on the jack shaft for meshing with said gears, means for driving the jack shaft from a power vehicle superimposed on the frame, an auxiliary power mechanism on the frame, and means for operatively connecting the auxiliary power mechanism with the jack shaft.

13. In an auto tractor, a carrier frame comprising tractor wheels, gears on said wheels, a jack shaft, removable spur wheels on the jack shaft for meshing with said gears, means for driving the jack shaft from a power vehicle superimposed on the frame, an auxiliary power mechanism removably mounted on the frame, and means for operatively connecting the auxiliary power mechanism with the jack shaft.

14. In an auto tractor, a carrier frame comprising traction wheels, means for operatively connecting the traction wheels with driving mechanism, of a self propelled vehicle superimposed in the frame, means for supporting the driving parts of the vehicle out of contact with the frame, and braces for retaining said driving parts in spaced relation to the frame.

15. In an auto tractor, a carrier frame comprising traction wheels, means for operatively connecting the traction wheels with driving mechanism of a self propelled vehicle superimposed on the frame, means for supporting the driving parts of the vehicle out of contact with the frame, and adjustable braces for retaining said driving parts in spaced relation to the frame.

16. In an auto tractor, a carrier frame, comprising traction wheels, a jack shaft on the frame operatively connected with the traction wheels, means for operatively connecting the jack shaft with the power wheels of a self propelled vehicle superimposed on the frame, means for elevating the vehicle power wheels above the frame, and supplemented braces connected with the vehicle power wheels and with the frame for the purpose set forth.

17. In an auto tractor, a carrier frame comprising traction wheels, a jack shaft on the frame operatively connected with the traction wheels, means for operatively connecting the jack shaft with the power wheels of a self propelled vehicle superimposed on the frame, means for elevating the vehicle power wheels above the frame, supplemental braces comprising rod sections for connection with the vehicle wheels and frame respectively and a turn buckle connecting the paired rod sections.

18. In combination, a tractor frame comprising traction wheels, a self propelled vehicle mounted on the frame and comprising drive wheels, means supporting the vehicle drive wheels out of contact with the frame, means operatively connecting the vehicle drive wheels with the traction wheels of the frame, and weights on the vehicle drive wheels for the purpose set forth.

19. In combination, a tractor frame comprising traction wheels, a self propelled vehicle mounted on the frame and comprising drive wheels, means supporting the vehicle drive wheels out of contact with the frame, means operatively connecting the vehicle drive wheels with the traction wheels of the frame, and weights removably mounted on the vehicle drive wheels for the purpose set forth.

20. In combination, a tractor frame comprising traction wheels, a self propelled vehicle mounted on the frame and comprising drive wheels, means supporting the vehicle drive wheels out of contact with the frame, sprocket wheels on the vehicle drive wheels, a jack shaft on the frame operatively connected with the traction wheels, sprocket wheels on the jack shaft, a belt on said sprocket wheels for operatively connecting the vehicle wheels with the jack shaft, extensions on the vehicle wheels and braces connecting said extensions with the carrier frame, for the purpose set forth.

21. In an auto tractor, a carrier frame comprising traction wheels, a motor driven vehicle on the frame, plates on the vehicle axle having centering seat portions, hoist mechanism on the frame comprising centering seat portions coöperative with the seat portions on said axle plates to automatically adjust the vehicle to the hoist mechanism, and means for operatively connecting the power mechanism of the vehicle with the traction wheels of the frame.

22. In an auto tractor, a carrier frame comprising traction wheels, a motor driven vehicle on the frame, inverted V-shaped seats on the vehicle, hoist mechanism comprising V-shaped seats arranged at right angle to the seats on the vehicle and coöperative therewith to automatically center the vehicle and hoist mechanism, and means operatively connecting the power mechanism of the motor vehicle with the traction wheels of the frame.

23. In combination with a carrier frame, hoist mechanism on said frame, comprising a shaft, a toggle block on said shaft, a pivoted lifting bar, a saddle on said bar, and a toggle arm connected to the lifting bar and to the toggle block.

24. In combination with a carrier frame, hoist mechanism on said frame, comprising a shaft, a toggle block on said shaft, a pivoted lifting bar, a saddle on said bar, and a toggle arm connected to the lifting bar and to the toggle block, said arm having a notched portion for engaging the shaft when the toggle parts are extended.

25. In combination with a carrier frame, a lifting bar, pivoted to said frame, a saddle on the free end of said lifting bar, depending notched levers carried by the saddle, a shaft engageable by the notches in said levers, and a lever block rigid on the shaft and having pivoted connections with said notched levers.

In testimony whereof, I affix my signature.

GEORGE L. SCHOFIELD.